No. 784,739. PATENTED MAR. 14, 1905.
M. J. GRIFFIN.
FIFTH WHEEL.
APPLICATION FILED AUG. 15, 1904.

Witnesses.
Lawrence D. Bigelow
P. J. Egan

Inventor.
Michael J. Griffin.
By James Shepard. Atty.

No. 784,739. Patented March 14, 1905.

UNITED STATES PATENT OFFICE.

MICHAEL J. GRIFFIN, OF NEW BRITAIN, CONNECTICUT.

FIFTH-WHEEL.

SPECIFICATION forming part of Letters Patent No. 784,739, dated March 14, 1905.

Application filed August 15, 1904. Serial No. 220,706.

*To all whom it may concern:*

Be it known that I, MICHAEL J. GRIFFIN, a citizen of the United States, residing at New Britain, in the county of Hartford and State of Connecticut, have invented certain new and useful Improvements in Fifth-Wheels, of which the following is a specification.

My invention relates to improvements in fifth-wheels for wagons; and the objects of my improvement are simplicity and economy in construction and efficiency and durability in use.

Figure 1:
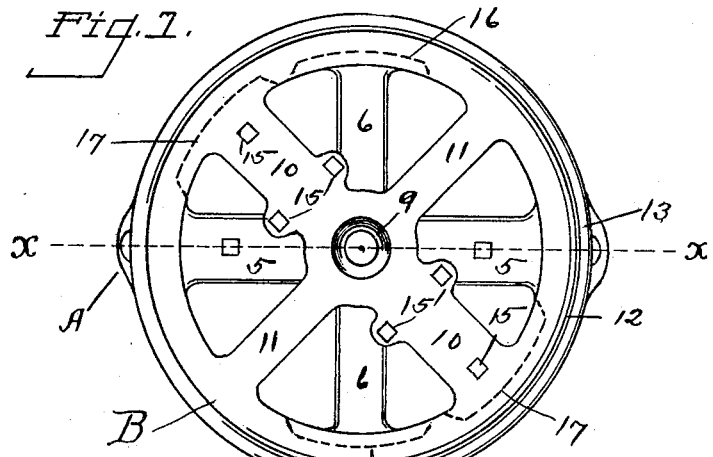
Figure 2:
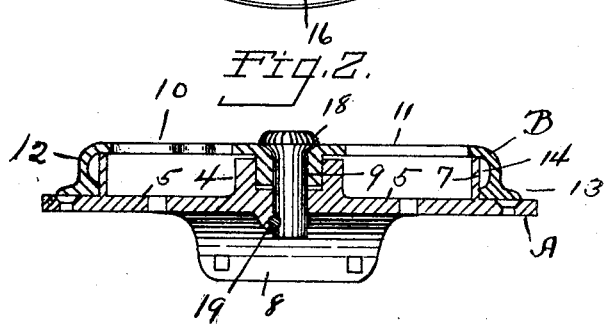
Figure 3:
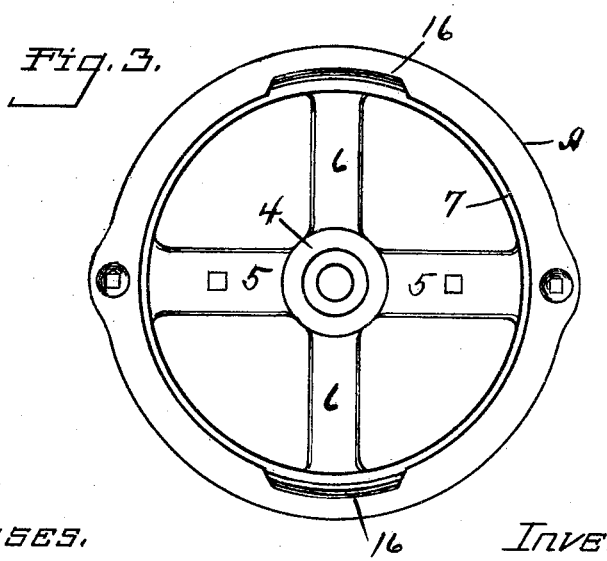

In the accompanying drawings, Figure 1 is a plan view of my fifth-wheel with one part partially rotated on the other to better show the construction and with the central pin removed. Fig. 2 is a sectional view of the same on the line $x\ x$ of Fig. 1, with the central pin in elevation. Fig. 3 is a detached plan view of the lower member of my fifth-wheel.

A designates the lower member, having a central hub 4, four spokes 5 5 and 6 6, an angle-plate rim or circle 7 at the outer ends of the said spokes, and flanges 8, extending downwardly from the under side of the hub, and spokes, whereby the said lower member may be secured on the top of the forward axle of a wagon with the spokes 5 5 in alinement therewith and so as to turn or swing with the said axle in the ordinary manner.

B designates the upper member, having a central hub 9, spokes 10 10 and 11 11, and rim or circle 12, connecting the outer ends of the said spokes. This rim or circle 12 is of an angular form in cross-section, with its upper corner rounded off, as shown, and with a plate-like base 13 at the edge, which confronts the companion member A. The inner edge of this plate-like base is designed to fit and bear upon the outer cylindrical face of the rim or circle 7, while a groove or space 14 is left on the inner face of the upper circle 12 above the plate-like base 13, as shown in Fig. 2. The spokes 10 10 of the said upper member are provided with bolt-holes 15 to enable the said member to be secured to the under side of the wagon-spring or a bolster on the wagon-body.

The cylindrical member of the lower rim or circle 7 is provided at its upper edge with outwardly-projecting lugs 16 at points opposite the ends of the lesser spokes 6 6, and the plate-like base is provided with correspondingly-shaped notches (indicated by broken lines 17 in Fig. 1) to let the lugs 16 pass through in assembling the two members. The contour of the lugs 16 is indicated by broken lines in Fig. 1. The notches 17 are opposite the ends of the spokes 10, while, as before stated, the lugs 16 are opposite the ends of the lesser spokes, whereby the said lugs 16 can be passed through the notches 17 for putting the two members together only when the members are turned a quarter-revolution from that in which the wagon axle and spring stand in alinement or square with each other. After the lugs pass through the notches in the plate-like base the parts may be rotated into their working position, the lugs in so doing passing through the groove or space 14, Fig. 2.

The hub 4 of the lower member is bored and counterbored to receive, respectively, the central pin 18 and hub 9, while the hub 9 of the upper member B is bored to receive the upper end of the central pin. This central pin may be secured in place in any proper manner—as, for example, by drilling a hole partly in the said pin and partly in the adjacent metal of the lower member A—to receive a key or pin 19, Fig. 2, in the well-known manner of fastening similar parts together.

By my improvement the construction is simple and inexpensive and the form is such that good smooth castings can be readily made. When put together, they have a smooth and firm bearing with well-protected surfaces, whereby the fifth-wheel is very efficient and durable.

I am aware that a prior patent shows and describes a fifth-wheel composed mainly of two circles, one having an annular groove of a T shape in cross-section with two enlarged openings and the other having T-shaped projections fitted into the said groove and connected therewith by entering at the enlarged openings, and I hereby disclaim the same.

I claim as my invention—

1. The herein-described fifth-wheel comprising an upper and lower member, the lower member having a rim or circle in the form of an angle-plate, with outwardly-projecting lugs at the upper edge of its cylindrical member, and the upper member having a rim or circle with a plate-like base, notched on its inner edge to receive the said lugs and having the said inner edge fitted to the outer cylindrical surface of the lower rim or circle.

2. In a fifth-wheel, the combination of an upper and lower member, each having a central tubular hub, with an outer rim or circle, the said rims or circles fitting one within the other, and provided with engaging lugs and recesses for holding the said two members together when the said lugs and recesses do not register, and a central pin passing through both of the said tubular hubs for holding the said two members together when the said lugs and recesses register with each other.

MICHAEL J. GRIFFIN.

Witnesses:
JAMES SHEPARD,
L. D. BIGELOW.